(12) United States Patent
Tang

(10) Patent No.: US 9,904,115 B2
(45) Date of Patent: Feb. 27, 2018

(54) LIQUID CRYSTAL PANELS

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Yuejun Tang, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 275 days.

(21) Appl. No.: 14/909,814

(22) PCT Filed: Jan. 22, 2016

(86) PCT No.: PCT/CN2016/071760
§ 371 (c)(1),
(2) Date: Feb. 3, 2016

(87) PCT Pub. No.: WO2017/107281
PCT Pub. Date: Jun. 29, 2017

(65) Prior Publication Data
US 2017/0322458 A1    Nov. 9, 2017

(30) Foreign Application Priority Data
Dec. 25, 2015    (CN) .......................... 2015 1 0991633

(51) Int. Cl.
*G02F 1/1337*    (2006.01)
*G02F 1/1335*    (2006.01)
(Continued)

(52) U.S. Cl.
CPC ...... *G02F 1/133753* (2013.01); *G02F 1/1368* (2013.01); *G02F 1/133528* (2013.01);
(Continued)

(58) Field of Classification Search
CPC ............. G02F 1/133753; G02F 1/1337; G02F 1/133707; G02F 1/1368; G02F 1/133528;
(Continued)

(56) References Cited

U.S. PATENT DOCUMENTS

| 2008/0013025 A1* | 1/2008 | Wu ................... G02F 1/133707 349/129 |
| 2016/0334671 A1* | 11/2016 | Han ................... G02F 1/133377 |
| 2017/0010487 A1* | 1/2017 | Ryu ................... G02F 1/133707 |

FOREIGN PATENT DOCUMENTS

| CN | 101196657 A | 6/2008 |
| CN | 103529604 A | 1/2014 |

(Continued)

*Primary Examiner* — Nathanael R Briggs
(74) *Attorney, Agent, or Firm* — Andrew C. Cheng

(57) ABSTRACT

A liquid crystal panel includes a first four-domain structure, a second four-domain structure, a third four-domain structure, and a fourth four-domain structure repeatedly arranged. A reference azimuth of the rotated liquid crystal within the first four-domain structure is the same with the second, the reference azimuth of the rotated liquid crystal within the third four-domain structure is the same with the fourth, a difference between the reference azimuth of the rotated liquid crystal within the first four-domain structure and the third four-domain structure is in a range between 40 and 50 degrees. A pretilt angle of the rotated liquid crystal within the first four-domain structure is different from the second, and the pretilt angle of the rotated liquid crystal within the third four-domain structure is different from the fourth. With such configuration, the light leakage and color shift issue may be eliminated.

10 Claims, 3 Drawing Sheets

(51) Int. Cl.
*G02F 1/1368* (2006.01)
*G02F 1/1343* (2006.01)

(52) U.S. Cl.
CPC .................. *G02F 1/133707* (2013.01); *G02F 2001/133531* (2013.01); *G02F 2001/133761* (2013.01); *G02F 2001/134345* (2013.01)

(58) Field of Classification Search
CPC ........ G02F 2001/133761; G02F 2001/134345; G02F 2001/133531
See application file for complete search history.

(56) References Cited

FOREIGN PATENT DOCUMENTS

| | | |
|---|---|---|
| CN | 104035247 A | 9/2014 |
| CN | 104155816 A | 11/2014 |

\* cited by examiner

LIQUID CRYSTAL PANELS

BACKGROUND OF THE INVENTION

1. Field of the Invention

The present disclosure relates to liquid crystal display technology, and more particularly to a liquid crystal panel.

2. Discussion of the Related Art

Liquid crystal displays (LCDs) are thin flat display devices including a plurality of color or monochrome pixels placed in front of the light source or a reflector plate. The power consumption of LCD is very low, and the LCDs are characterized by attributes such as high-quality, small size, and light weight, and thus have become the mainstream display. LCD monitors have been widely used in various electronic products, for example, a display screen of the computer equipment, mobile phones or digital photo frames.

The LCD panel is an important part of the liquid crystal display. There are a variety of display technologies, wherein the VA display technology is the collective name for all vertical alignment liquid crystal display technology. Depending on the rotation mode and the structure of the pixels, VA display technology may include MVA technology (multi-quadrant vertical alignment technology), which relates to the wide viewing angle display technology. Conventional MVA technology may have serious dark state light leakage due to projections. After the projections are removed, the dark state light leakage problems may be greatly enhanced. At the same time, the transmission rate is also improved, and the images may be more three-dimensional.

FIG. 1 is a top view of the VA LCD of eight domains. FIG. 2 is a sectional view showing the directions of the liquid crystals of the VA LCD of eight domains. As shown in FIG. 1, the liquid crystals in the top area and the down area are respectively of four domains. The two four-domains structures constitute one sub-pixel. As shown, the reference azimuth of the four-domains liquid crystals are the same. As shown in FIG. 2, the pretilt angle of the two four-domains liquid crystals are different. Thus, one sub-pixel may have eight rotation states of liquid crystal, and thus the visual compensation effect may be better. However, the light leakage along a slant direction is still huge, and the color shift issue also exists.

SUMMARY

In order to overcome the above problems, a liquid crystal panel is proposed to eliminate the light leakage along a slant direction and the color shift issue.

In one aspect, a liquid crystal panel includes: a first four-domain structure, a second four-domain structure, a third four-domain structure, and a fourth four-domain structure repeatedly arranged, wherein the first four-domain structure, the second four-domain structure, the third four-domain structure, and the fourth four-domain structure form a sub-pixel, and the sub-pixel includes sixteen liquid crystal rotation states; wherein a reference azimuth of the rotated liquid crystal within the first four-domain structure is the same with the reference azimuth of the rotated liquid crystal within the second four-domain structure, the reference azimuth of the rotated liquid crystal within the third four-domain structure is the same with the reference azimuth of the rotated liquid crystal within the fourth four-domain structure, a difference between the reference azimuth of the rotated liquid crystal within the first four-domain structure and the reference azimuth of the rotated liquid crystal within the third four-domain structure is in a range between 40 and 50 degrees, and a pretilt angle of the rotated liquid crystal within the first four-domain structure is different from the pretilt angle of the rotated liquid crystal within the second four-domain structure, and the pretilt angle of the rotated liquid crystal within the third four-domain structure is different from the pretilt angle of the rotated liquid crystal within the fourth four-domain structure.

Wherein the liquid crystal panel further includes a polarizer, the first four-domain structure and the second four-domain structure share the polarizer, and the third four-domain structure and the fourth four-domain structure share the polarizer, an included angle formed by an absorption axis of the polarizer of the first four-domain structure and the absorption axis of the polarizer of the third four-domain structure is in a range between 38 and 52 degrees.

Wherein the pretilt angle of the rotated liquid crystal within the first four-domain structure is the same with the pretilt angle of the rotated liquid crystal within the third four-domain structure, and the pretilt angle of the rotated liquid crystal within the second four-domain structure is the same with the pretilt angle of the rotated liquid crystal within the fourth four-domain structure.

Wherein the first four-domain structure and the third four-domain structure receive data signals from the same TFT, and the second four-domain structure and the fourth four-domain structure receive the data signals from the same TFT.

In another aspect, a liquid crystal panel includes: a first four-domain structure, a second four-domain structure, a third four-domain structure, and a fourth four-domain structure repeatedly arranged; wherein the first four-domain structure and the second four-domain structure form a first sub-pixel, and the third four-domain structure and the fourth four-domain structure form a second sub-pixel, and the first sub-pixel and the second sub-pixel includes sixteen liquid crystal rotation states; and wherein a reference azimuth of the rotated liquid crystal within the first four-domain structure is the same with the reference azimuth of the rotated liquid crystal within the second four-domain structure, the reference azimuth of the rotated liquid crystal within the third four-domain structure is the same with the reference azimuth of the rotated liquid crystal within the fourth four-domain structure, a difference between the reference azimuth of the rotated liquid crystal within the first four-domain structure and the reference azimuth of the rotated liquid crystal within the third four-domain structure is in a range between 40 and 50 degrees, and a pretilt angle of the rotated liquid crystal within the first four-domain structure is different from the pretilt angle of the rotated liquid crystal within the second four-domain structure, and the pretilt angle of the rotated liquid crystal within the third four-domain structure is different from the pretilt angle of the rotated liquid crystal within the fourth four-domain structure.

Wherein the liquid crystal panel further includes a polarizer, the first four-domain structure and the second four-domain structure share the polarizer, and the third four-domain structure and the fourth four-domain structure share the polarizer, an included angle formed by an absorption axis of the polarizer of the first four-domain structure and the absorption axis of the polarizer of the third four-domain structure is in a range between 38 and 52 degrees.

Wherein the pretilt angle of the rotated liquid crystal within the first four-domain structure is the same with the pretilt angle of the rotated liquid crystal within the third four-domain structure, and the pretilt angle of the rotated liquid crystal within the second four-domain structure is the same with the pretilt angle of the rotated liquid crystal within the fourth four-domain structure.

In another aspect, a liquid crystal panel includes: a first four-domain structure, a second four-domain structure, a third four-domain structure, and a fourth four-domain structure repeatedly arranged; wherein the first four-domain structure and the fourth four-domain structure form a first sub-pixel, and the second four-domain structure and the third four-domain structure form a second sub-pixel, and the first sub-pixel and the second sub-pixel includes sixteen liquid crystal rotation states; and wherein a reference azimuth of the rotated liquid crystal within the first four-domain structure is the same with the reference azimuth of the rotated liquid crystal within the second four-domain structure, the reference azimuth of the rotated liquid crystal within the third four-domain structure is the same with the reference azimuth of the rotated liquid crystal within the fourth four-domain structure, a difference between the reference azimuth of the rotated liquid crystal within the first four-domain structure and the reference azimuth of the rotated liquid crystal within the third four-domain structure is in a range between 40 and 50 degrees, and a pretilt angle of the rotated liquid crystal within the first four-domain structure is different from the pretilt angle of the rotated liquid crystal within the second four-domain structure, and the pretilt angle of the rotated liquid crystal within the third four-domain structure is different from the pretilt angle of the rotated liquid crystal within the fourth four-domain structure.

Wherein the liquid crystal panel further includes polarizers, an absorption axis of the polarizer of the first four-domain structure is parallel to the absorption axis of the polarizer of the second four-domain structure, the absorption axis of the polarizer of the third four-domain structure is parallel to the absorption axis of the polarizer of the fourth four-domain structure, and an included angle formed by the absorption axis of the polarizer of the first four-domain structure and the absorption axis of the polarizer of the third four-domain structure is in a range between 38 and 52 degrees.

Wherein the pretilt angle of the rotated liquid crystal within the first four-domain structure is the same with the pretilt angle of the rotated liquid crystal within the third four-domain structure, and the pretilt angle of the rotated liquid crystal within the second four-domain structure is the same with the pretilt angle of the rotated liquid crystal within the fourth four-domain structure.

In this way, the liquid crystal layer includes 16 rotation states. Compared to the conventional eight-domains display technology, there are eight additional rotation states, which may reduce the light leakage along the slant direction at least half so as to increase the contrastness when the viewing angle is large. In addition, the rotation directions of the liquid crystal molecules within the four domains are uniformly distributed, which can greatly eliminate the color shift issue.

DETAILED DESCRIPTION OF THE EMBODIMENTS

Figure 1:
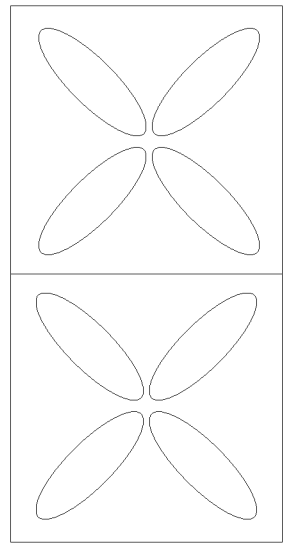
FIG. 1 is a top view of the conventional VA LCD of eight domains.
Figure 2:
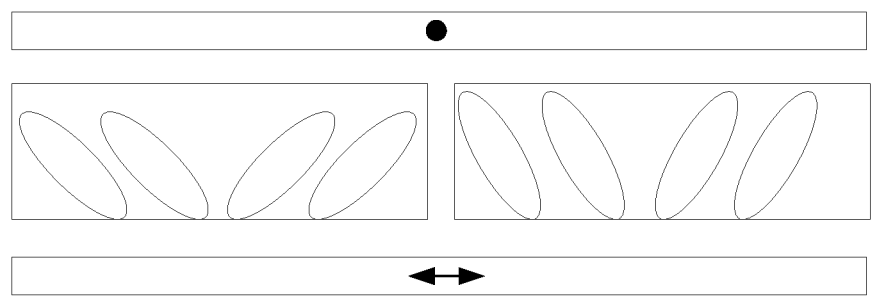
FIG. 2 is a sectional view showing the directions of the liquid crystals of the conventional VA LCD of eight domains.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 3:
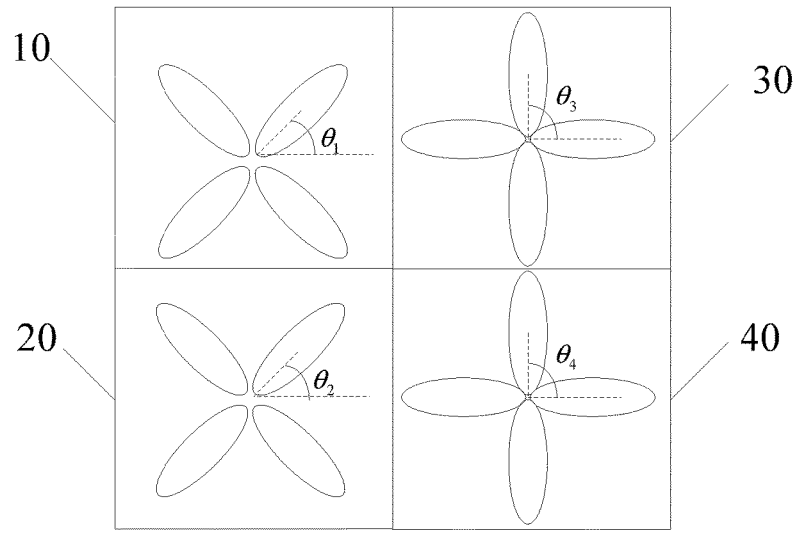
FIG. 3 is a top view of the liquid crystals of the liquid crystal panel in accordance with one embodiment.

FIG. 3 is a top view of the liquid crystals of the liquid crystal panel in accordance with one embodiment. The liquid crystal panel, as shown in FIG. 3, shows the liquid crystal layer includes a first four-domain structure 10, a second four-domain structure 20, a third four-domain structure 30, and a fourth four-domain structure 40 repeatedly arranged. The four four-domain structures may be arranged in a different way from the configuration shown in FIG. 3.

Persons skilled in the art can understand that one four-domain structure includes four rotation states. Specifically, the liquid crystal molecules within each of the domains may rotate respectively along four directions. The included angles formed by projections of the four directions on the horizontal plane and the horizontal line are respectively θ, θ+90, θ+180, and θ+270, wherein θ is generally referred to as the reference azimuth of the rotated liquid crystal molecules. The included angles formed by the four directions and the horizontal plane are the same, and the included angle is referred to as the pretilt angle of the rotated liquid crystal molecules of four-domains.

Figure 4:
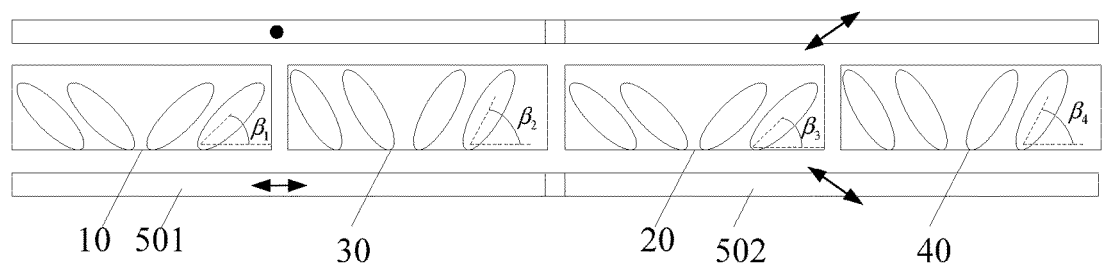
FIG. 4 is a sectional view showing the directions of the liquid crystals of the liquid crystal panel in accordance with one embodiment.

In the embodiment, the four four-domain structure totally include 16 rotation states. Specifically, as shown in FIG. 3, the reference azimuth $θ_1$ of the first four-domain structure 10 and the reference azimuth $θ_2$ of the second four-domain structure 20 are the same. The reference azimuth $θ_3$ of the third four-domain structure 30 is the same with the reference azimuth $θ_4$ of the fourth four-domain structure 40. In addition, the difference between the reference azimuth $θ_1$ of the first four-domain structure 10 and the reference azimuth $θ_3$ of the third four-domain structure 30 is in a range between 40 and 50 degrees. Preferably, the difference between the reference azimuth $θ_1$ of the first four-domain structure 10 and the reference azimuth $θ_3$ of the third four-domain structure 30 is 45 degrees. For instance, the reference azimuth of the first four-domain structure 10 and the second four-domain structure 20 may be 45 degrees, and the reference azimuth of the third four-domain structure 30 and the fourth four-domain structure 40 may be 0 degree. As shown in FIG. 4, the pretilt angle $\beta_1$ of the first four-domain structure 10 is different from the pretilt angle $\beta_2$ of the second four-domain structure 20. The pretilt angle $\beta_3$ of the third four-domain structure 30 is different from the pretilt angle $\beta_4$ of the fourth four-domain structure 40.

In this way, the liquid crystal layer includes 16 rotation states. Compared to the conventional eight-domains display technology, there are eight additional rotation states, which may reduce the light leakage along the slant direction at least half so as to increase the contrastness when the viewing angle is large. In addition, as the difference between the reference azimuth of the first four-domain structure 10, the second four-domain structure 20, the third four-domain structure 30, and the fourth four-domain structure 40 is 45 degrees, the rotation directions of the liquid crystal molecules within the four domains are uniformly distributed, which can greatly eliminate the color shift issue.

In an example, the angles of the protrusive structure and the slit of the third four-domain structure 30 and the fourth four-domain structure 40 and that of the first four-domain structure 10 and the second four-domain structure 20 respectively form the included angle equaling to 45 degrees such that the difference between the reference azimuths of the first four-domain structure 10, the second four-domain structure 20 and the reference azimuths of the third four-domain structure 30, the fourth four-domain structure 40 is about 45 degrees.

In another example, an optical alignment method may be adopted such that the difference between the reference azimuth of the first four-domain structure 10, the second four-domain structure 20, the third four-domain structure 30, and the fourth four-domain structure 40 is 45 degrees. For instance, an incident direction of the ultraviolet rays for aligning the first four-domain structure 10 and the second four-domain structure 20 is configured to be different from the incident direction of the ultraviolet rays for aligning the third four-domain structure 30 and the fourth four-domain structure 40 for 45 degrees. As the pretilt angle of one four-domain structure is subject to the applied voltage. In order to reduce the number of component controlling the voltage, in one embodiment, the pretilt angle of the liquid crystal within the first four-domain structure 10 may be the same with the pretilt angle of the liquid crystal within the third four-domain structure 30, and the pretilt angle of the liquid crystal within the second four-domain structure 20 may be the same with the pretilt angle of the liquid crystal within the fourth four-domain structure 40. In this way, when the voltage of the liquid crystal panel is controlled by the TFT, the four four-domain structures may receive the data signals from four TFTs. Preferably, when the four four-domain structures belong to one sub-pixel, the first four-domain structure 10 and the third four-domain structure 30 may receive the data signals from the same TFT, and the second four-domain structure 20 and the fourth four-domain structure 40 may receive the data signals from the same TFT. In this way, the 16-domain display may be accomplished without increasing the number of TFTs. In addition, a capacitor may be configured such that the TFT may provide the data signals to the second four-domain structure 20 and the fourth four-domain structure 40 due to capacitive coupling effect.

In one embodiment, the liquid crystal panel may also include a polarizer, which may be a metal wire grid polarizer or other structure may realize optical polarization. The absorption axis of the polarizer of the first four-domain structure 10 is parallel to the absorption axis of the polarizer of the second four-domain structure 20. The absorption axis of the polarizer of the third four-domain structure 30 is parallel to the absorption axis of the polarizer of the fourth four-domain structure 40. In addition, the included angle formed by the absorption axis of the polarizer of the first four-domain structure 10 and the absorption axis of the polarizer of the third four-domain structure 30 is in a range between 38 and 52 degrees. When the difference between the reference azimuth of the liquid crystal within the first four-domain structure 10 and the reference azimuth of the liquid crystal within the third four-domain structure 30 is 45 degrees, the included angle formed by the absorption axis of the polarizer of the first four-domain structure 10 and the absorption axis of the polarizer within the third four-domain structure 30 is preferably 45 degrees. In this way, when each of the liquid crystal molecules within the four four-domain structure is rotated due to the applied voltage, the absorption axis of the polarizer and the liquid crystal molecule form the included angle equaling to 45 degrees. At this moment, the optical efficiency is the highest. The first four-domain structure 10 and the second four-domain structure 20 of the same sub-pixel may share the polarizer, and the third four-domain structure 30 and the fourth four-domain structure 40 of the same sub-pixel may share the polarizer.

In an example, the polarizer may be arranged on a top layer and a down layer, and are respectively referred to a top polarizer and a down polarizer. The top polarizer and the down polarizer may be arranged outside the top substrate and the down substrate. Alternatively, the top polarizer and the down polarizer may be arranged between the top substrate and the down substrate. Alternatively, one of the top polarizer and the down polarizer may be arranged outside the top/down substrate, and the other one may be arranged inside the top/down substrate. A better optical performance may be obtained when the top polarizer and the down polarizer are arranged within the top/down substrate. The absorption axis of the top polarizer is perpendicular to that of the down polarizer within the same four-domain structure. Preferably, the absorption axis of the top polarizer or the down polarizer of the first four-domain structure 10 and the absorption axis of the top polarizer or the down polarizer of the third four-domain structure 30 form the included angle equaling to 45 degrees, and the absorption axis of the top polarizer or the down polarizer of the second four-domain structure 20 and the absorption axis of the top polarizer or the down polarizer of the fourth four-domain structure 40 form the included angle equaling to 45 degrees.

The top polarizer and the down polarizer may be configured to be of a single-layer structure, or a double-layer structure. Alternatively, one of the top polarizer and the down polarizer may be configured to be of the single-layer structure, and the other one may be configured to be of the double-layer structure.

The single-layer structure may be the metal wire grid polarizer. The axis of the metal wire grid polarizer may be patterned. When the top polarizer and the down polarizer are configured to be the metal wire grid polarizer, the pattern of the top polarizer and the down polarizer form the included angle equaling to 45 degrees. The double-layer structure may be organic polarizer having double-layer pattern, such as polyvinyl alcohol polarizing film, the dichroic organic dye polarizer. Preferably, the axis of the double-layer organic polarizer forms the included angle equaling to 45 degrees. The double-layer organic polarizer may be bonded together. However, the partial photonic of the organic polarizer on the second layer has to be etched away for the locations provided with the partial photonic of the organic polarizer on the first layer, and the partial photonic of the organic polarizer on the first layer has to be etched away for the locations provided with the partial photonic of the organic polarizer on the second layer.

The double-layer structure may be the structure overlapped by one organic polarizer layer and a half-wave plate having a patterned layer, wherein the half-wave plates of the third four-domain structure 30 and the 40 and the 40 include the half-wave phase delay, the half-wave plates of the first four-domain structure 10 and the second four-domain structure 20 include zero phase delay. With respect to the above overlap structure of the top polarizer, the patterned half-wave plate is configured on the partial photonic of the organic polarizer close to the liquid crystals. The slow axis of the half-wave plate and the axis of the organic polarizer form the included angle equaling to 22.5 degrees. In this way, the polarized directions of the polarized light beams may be rotated for 45 degrees after passing the liquid crystal layer. With respect to the above overlap structure of the down polarizer, the patterned half-wave plate is configured on the partial photonic of the organic polarizer close to the liquid crystals. The slow axis of the half-wave plate and the axis of the organic polarizer form the included angle equaling to 22.5 degrees. In this way, the polarized directions of the polarized light beams may be rotated for 45 degrees after passing the liquid crystal layer.

It can be understood that the liquid crystal panel may include other components. The present disclosure only focus on the liquid crystal layer, and thus the descriptions relating to other components are omitted hereinafter.

In one example, the first four-domain structure 10, the second four-domain structure 20, the third four-domain structure 30, and the fourth four-domain structure 40 form one sub-pixel. FIG. 4 is a sectional view showing the directions of the liquid crystals of the liquid crystal panel in accordance with one embodiment. The first four-domain structure 10 and the second four-domain structure 20 shares the polarizer 501, and the third four-domain structure 30 and the fourth four-domain structure 40 share the polarizer 502. The direction of the absorption axis of the polarizer 501 and the polarizer 502 are indicated by the arrow in FIG. 4. The absorption axis of the polarizer 501 of the first four-domain structure 10 and the absorption axis of the polarizer 502 of the third four-domain structure 30 form the included angle equaling to 45 degrees.

Figure 5:
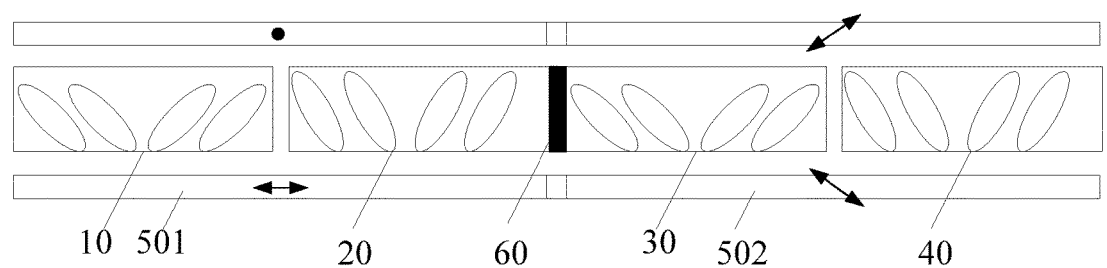
FIG. 5 is a sectional view showing the directions of the liquid crystals of the liquid crystal panel in accordance with another embodiment.

In another embodiment, the first four-domain structure 10 and the second four-domain structure 20 form a first sub-pixel, and the third four-domain structure 30 and the fourth four-domain structure 40 form a second sub-pixel. FIG. 5 is a sectional view showing the directions of the liquid crystals of the liquid crystal panel in accordance with another embodiment. The first four-domain structure 10 and the second four-domain structure 20 form the first sub-pixel, and the third four-domain structure 30 and the fourth four-domain structure 40 form the second sub-pixel. The first sub-pixel and the second sub-pixel are isolated by a black matrix 60. The first four-domain structure 10 and the second four-domain structure 20 share the polarizer 501, and the third four-domain structure 30 and the fourth four-domain structure 40 share the polarizer 502. The absorption axis of the polarizer 501 of the first four-domain structure 10 and the absorption axis of the polarizer 502 of the third four-domain structure 30 form the included angle equaling to 45 degrees.

Figure 6:
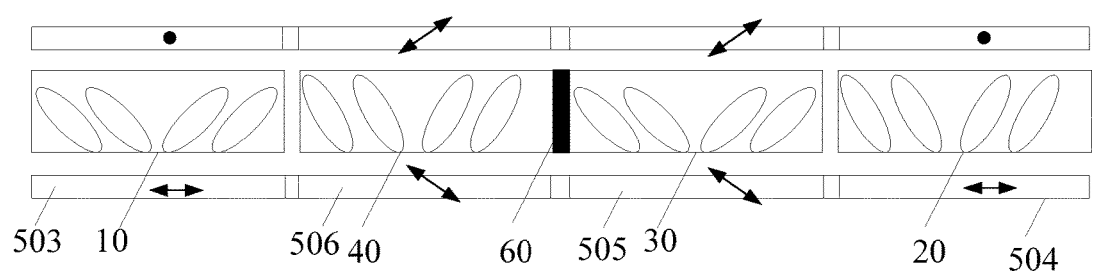
FIG. 6 is a sectional view showing the directions of the liquid crystals of the liquid crystal panel in accordance with another embodiment.

In another embodiment, the first four-domain structure 10 and the fourth four-domain structure 40 form the first sub-pixel, and the second four-domain structure 20 and the third four-domain structure 30 form the second sub-pixel. FIG. 6 is a sectional view showing the directions of the liquid crystals of the liquid crystal panel in accordance with another embodiment. The first four-domain structure 10 and the fourth four-domain structure 40 form the first sub-pixel, and the second four-domain structure 20 and the third four-domain structure 30 form the second sub-pixel. The first sub-pixel and the second sub-pixel are isolated by a black matrix 60. The direction of the absorption axis of the polarizers 503, 504, 505, 506 are indicated by the arrows in FIG. 6. The absorption axis of the polarizer 503 of the first four-domain structure 10 is parallel to the absorption axis of the polarizer 504 of the second four-domain structure 20, and the absorption axis of the polarizer 505 of the third four-domain structure 30 is parallel to the absorption axis of the polarizer 506 of the fourth four-domain structure 40. In addition, the absorption axis of the polarizer 503 of the first four-domain structure 10 and the absorption axis of the polarizer 505 of the third four-domain structure 30 form the included angle equaling to 45 degrees.

The first sub-pixel and the second sub-pixel are alternatively arranged along a row direction or a column direction. For instance, with respect to each RGB colors, the sub-pixels include alternative first sub-pixel and the second sub-pixel. The R sub-pixel in the odd row may be the first pixel structure, and the R sub-pixel in the even row may be the second pixel structure.

In this way, the liquid crystal layer includes 16 rotation states. Compared to the conventional eight-domains display technology, there are eight additional rotation states, which may reduce the light leakage along the slant direction at least half so as to increase the contrastness when the viewing angle is large. In addition, the rotation directions of the liquid crystal molecules within the four domains are uniformly distributed, which can greatly eliminate the color shift issue.

It should be noted that the relational terms herein, such as "first" and "second", are used only for differentiating one entity or operation, from another entity or operation, which, however do not necessarily require or imply that there should be any real relationship or sequence.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel, comprising:
a first four-domain structure, a second four-domain structure, a third four-domain structure, and a fourth four-domain structure repeatedly arranged,
wherein the first four-domain structure, the second four-domain structure, the third four-domain structure, and the fourth four-domain structure form a sub-pixel, and the sub-pixel comprises sixteen liquid crystal rotation states;
wherein a reference azimuth of the rotated liquid crystal within the first four-domain structure is the same with the reference azimuth of the rotated liquid crystal within the second four-domain structure, the reference azimuth of the rotated liquid crystal within the third four-domain structure is the same with the reference azimuth of the rotated liquid crystal within the fourth four-domain structure, a difference between the reference azimuth of the rotated liquid crystal within the first four-domain structure and the reference azimuth of the rotated liquid crystal within the third four-domain structure is in a range between 40 and 50 degrees, and a pretilt angle of the rotated liquid crystal within the first four-domain structure is different from the pretilt angle of the rotated liquid crystal within the second four-domain structure, and the pretilt angle of the rotated liquid crystal within the third four-domain structure is different from the pretilt angle of the rotated liquid crystal within the fourth four-domain structure.

2. The liquid crystal panel as claimed in claim 1, wherein the liquid crystal panel further comprises a polarizer, the first four-domain structure and the second four-domain structure share the polarizer, and the third four-domain structure and the fourth four-domain structure share the polarizer, an included angle formed by an absorption axis of the polarizer of the first four-domain structure and the absorption axis of the polarizer of the third four-domain structure is in a range between 38 and 52 degrees.

3. The liquid crystal panel as claimed in claim 1, wherein the pretilt angle of the rotated liquid crystal within the first four-domain structure is the same with the pretilt angle of the rotated liquid crystal within the third four-domain structure, and the pretilt angle of the rotated liquid crystal within the second four-domain structure is the same with the pretilt angle of the rotated liquid crystal within the fourth four-domain structure.

4. The liquid crystal panel as claimed in claim 3, wherein the first four-domain structure and the third four-domain structure receive data signals from the same TFT, and the second four-domain structure and the fourth four-domain structure receive the data signals from the same TFT.

5. A liquid crystal panel, comprising:
a first four-domain structure, a second four-domain structure, a third four-domain structure, and a fourth four-domain structure repeatedly arranged;
wherein the first four-domain structure and the second four-domain structure form a first sub-pixel, and the third four-domain structure and the fourth four-domain structure form a second sub-pixel, and the first sub-pixel and the second sub-pixel comprises sixteen liquid crystal rotation states; and
wherein a reference azimuth of the rotated liquid crystal within the first four-domain structure is the same with the reference azimuth of the rotated liquid crystal within the second four-domain structure, the reference azimuth of the rotated liquid crystal within the third four-domain structure is the same with the reference azimuth of the rotated liquid crystal within the fourth four-domain structure, a difference between the reference azimuth of the rotated liquid crystal within the first four-domain structure and the reference azimuth of the rotated liquid crystal within the third four-domain structure is in a range between 40 and 50 degrees, and a pretilt angle of the rotated liquid crystal within the first four-domain structure is different from the pretilt angle of the rotated liquid crystal within the second four-domain structure, and the pretilt angle of the rotated liquid crystal within the third four-domain structure is different from the pretilt angle of the rotated liquid crystal within the fourth four-domain structure.

6. The liquid crystal panel as claimed in claim 5, wherein the liquid crystal panel further comprises a polarizer, the first four-domain structure and the second four-domain structure share the polarizer, and the third four-domain structure and the fourth four-domain structure share the polarizer, an included angle formed by an absorption axis of the polarizer of the first four-domain structure and the absorption axis of the polarizer of the third four-domain structure is in a range between 38 and 52 degrees.

7. The liquid crystal panel as claimed in claim 5, wherein the pretilt angle of the rotated liquid crystal within the first four-domain structure is the same with the pretilt angle of the rotated liquid crystal within the third four-domain structure, and the pretilt angle of the rotated liquid crystal within the second four-domain structure is the same with the pretilt angle of the rotated liquid crystal within the fourth four-domain structure.

8. A liquid crystal panel, comprising:
a first four-domain structure, a second four-domain structure, a third four-domain structure, and a fourth four-domain structure repeatedly arranged;
wherein the first four-domain structure and the fourth four-domain structure form a first sub-pixel, and the second four-domain structure and the third four-domain structure form a second sub-pixel, and the first sub-pixel and the second sub-pixel comprises sixteen liquid crystal rotation states; and
wherein a reference azimuth of the rotated liquid crystal within the first four-domain structure is the same with the reference azimuth of the rotated liquid crystal within the second four-domain structure, the reference azimuth of the rotated liquid crystal within the third four-domain structure is the same with the reference azimuth of the rotated liquid crystal within the fourth four-domain structure, a difference between the reference azimuth of the rotated liquid crystal within the first four-domain structure and the reference azimuth of the rotated liquid crystal within the third four-domain structure is in a range between 40 and 50 degrees, and a pretilt angle of the rotated liquid crystal within the first four-domain structure is different from the pretilt angle of the rotated liquid crystal within the second four-domain structure, and the pretilt angle of the rotated liquid crystal within the third four-domain structure is different from the pretilt angle of the rotated liquid crystal within the fourth four-domain structure.

9. The liquid crystal panel as claimed in claim 8, wherein the liquid crystal panel further comprises polarizers, an absorption axis of the polarizer of the first four-domain structure is parallel to the absorption axis of the polarizer of the second four-domain structure, the absorption axis of the polarizer of the third four-domain structure is parallel to the absorption axis of the polarizer of the fourth four-domain structure, and an included angle formed by the absorption axis of the polarizer of the first four-domain structure and the absorption axis of the polarizer of the third four-domain structure is in a range between 38 and 52 degrees.

10. The liquid crystal panel as claimed in claim 8, wherein the pretilt angle of the rotated liquid crystal within the first four-domain structure is the same with the pretilt angle of the rotated liquid crystal within the third four-domain structure, and the pretilt angle of the rotated liquid crystal within the second four-domain structure is the same with the pretilt angle of the rotated liquid crystal within the fourth four-domain structure.

* * * * *